US007194436B2

(12) United States Patent
Tammaro

(10) Patent No.: US 7,194,436 B2
(45) Date of Patent: Mar. 20, 2007

(54) METHOD AND SYSTEM FOR INTERNET BASED FINANCIAL AUTO CREDIT APPLICATION

(75) Inventor: Nancy A. Tammaro, Plymouth, MI (US)

(73) Assignee: Ford Motor Company, Dearborn, MI (US)

( * ) Notice: Subject to any disclaimer, the term of this patent is extended or adjusted under 35 U.S.C. 154(b) by 1112 days.

(21) Appl. No.: 09/131,637

(22) Filed: Aug. 10, 1998

(65) Prior Publication Data

US 2001/0011246 A1 Aug. 2, 2001

(51) Int. Cl.
G06Q 40/00 (2006.01)
(52) U.S. Cl. ............................. 705/38; 705/35; 705/39
(58) Field of Classification Search ................. 705/38, 705/39
See application file for complete search history.

(56) References Cited

U.S. PATENT DOCUMENTS

| 4,736,294 A | | 4/1988 | Gill et al. |
| 5,220,501 A | | 6/1993 | Lawlor et al. |
| 5,239,462 A | * | 8/1993 | Jones et al. .................. 364/408 |
| 5,347,632 A | | 9/1994 | Filepp et al. |
| 5,455,945 A | * | 10/1995 | VanderDrift ................ 395/600 |
| 5,611,052 A | | 3/1997 | Dykstra et al. |
| 5,664,115 A | | 9/1997 | Fraser |
| 5,699,527 A | * | 12/1997 | Davidson .................... 395/238 |
| 5,706,442 A | | 1/1998 | Anderson et al. |
| 5,774,883 A | * | 6/1998 | Andersen et al. ............. 705/35 |
| 5,878,403 A | * | 3/1999 | DeFrancesco et al. ........ 705/38 |
| 5,899,982 A | * | 5/1999 | Randle ......................... 705/35 |
| 6,092,121 A | * | 7/2000 | Bennett et al. ............. 709/250 |

FOREIGN PATENT DOCUMENTS

GB 9819159.6 * 6/1999

OTHER PUBLICATIONS

Mulqueen, John T., "Users Test Real-Time Car Registration," CommunicationsWeek, May 17, 1993, p. 15.*
"Pennsylvania's Web Site Breaks One Million Hit Mark," Newsbytes News Network, Sep. 13, 1996.*
"Sprint Offers Universities Instant Access to the Net," America's Network, Oct. 1, 1995, p. 36.*

(Continued)

Primary Examiner—V. Millin
Assistant Examiner—Dan Kesack
(74) Attorney, Agent, or Firm—David B. Kelley; Brooks & Kushman

(57) ABSTRACT

A method and system are provided which enables automotive dealers to use a standard PC and Internet-type browser software package to enter credit/loan application data over the Internet. Such data can then be automatically distributed via the Internet to designated financial institutes or loan service providers for processing. The system also receives responses back from the service providers and displays these responses to the requesting dealer. To accommodate financial institutions which have not been provided with prearranged access, the system provides automatic enablement of facsimile transmission to dealer-chosen banks and credit unions. In addition, other information which facilitates the automotive credit process, such as completion of standard department of motor vehicles forms, insurance forms, etc., may also may be collected and transmitted electronically to the institution/company either directly or through a credit application service provider, with electronic responses provided back to the requesting dealer.

8 Claims, 2 Drawing Sheets

OTHER PUBLICATIONS

"Malaysia: COMM. Opps./Multimedia Super Corridor Market (2), U.S. and Foreign Commercial Service (US&FCS)," Industry Sector Analysis, Mar. 19, 1998.*

Edmonson, R G. State list of car registrations yields cheap, easy car loan leads. Credit Union News; Feb. 21, 1997; 17, 4; Banking Information Source p. M3.*

* cited by examiner

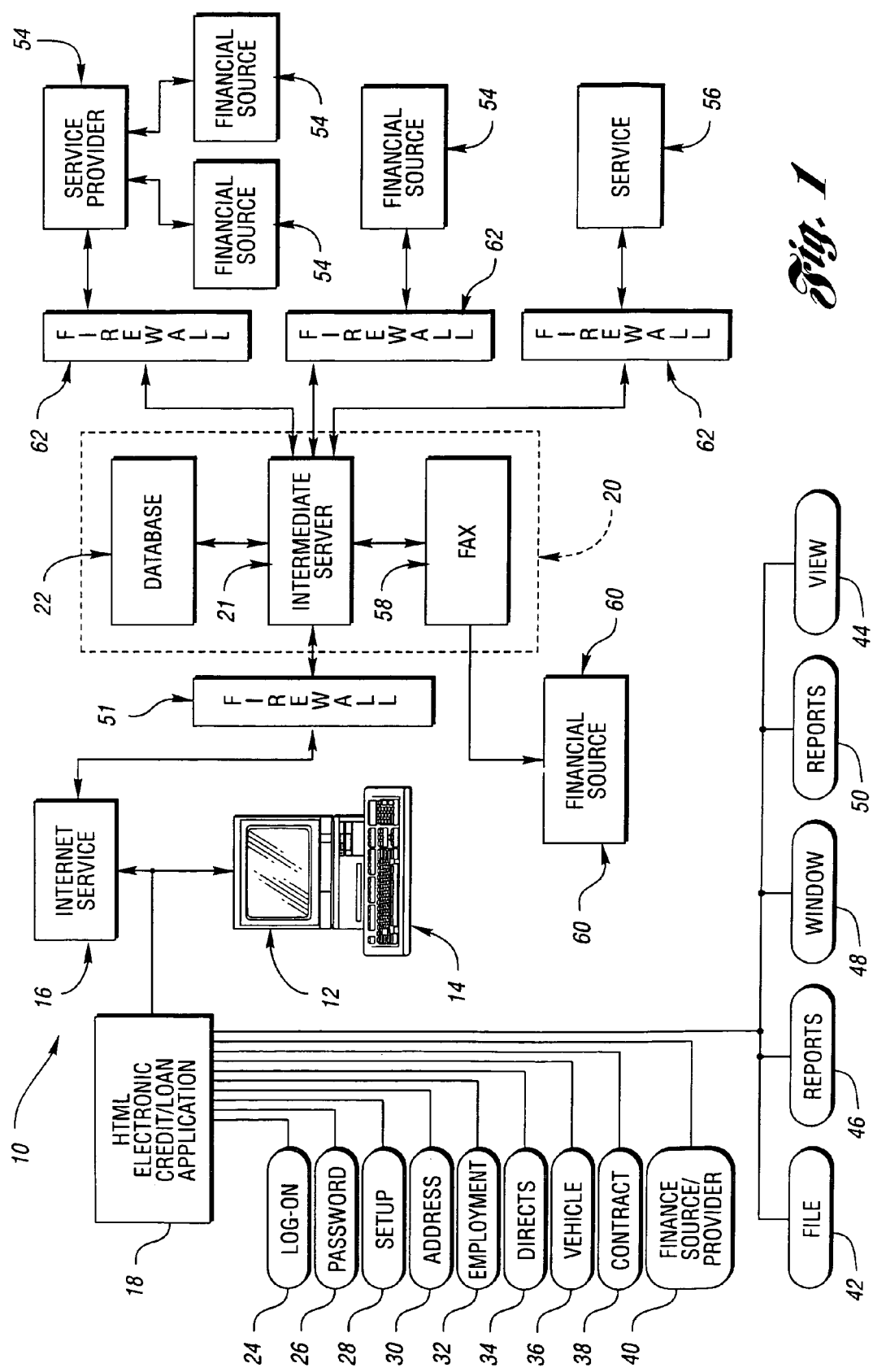

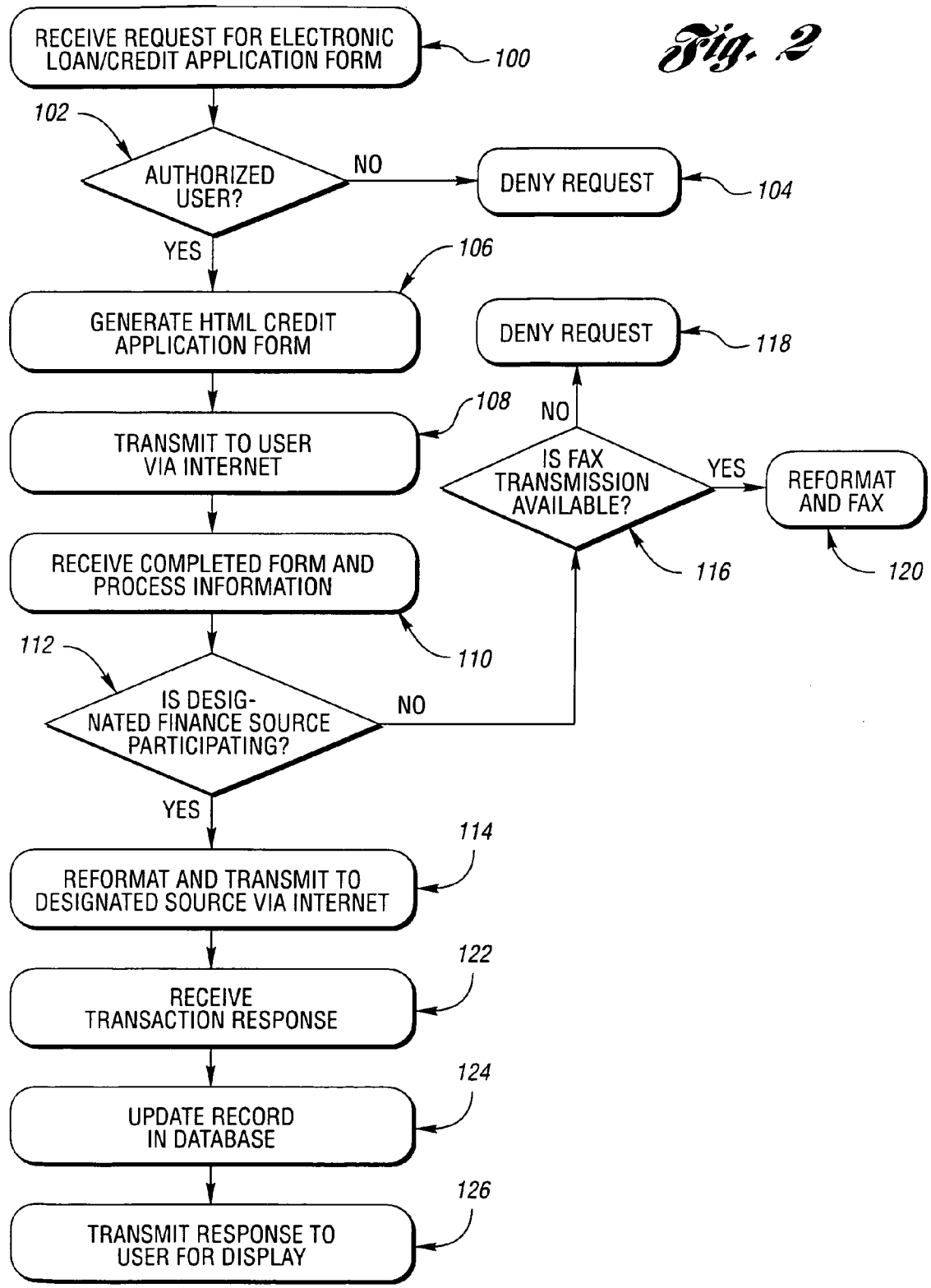

METHOD AND SYSTEM FOR INTERNET BASED FINANCIAL AUTO CREDIT APPLICATION

TECHNICAL FIELD

The present invention generally relates to a client/server architecture for facilitating approval of credit applications from customers during purchasing transactions at a multitude of different retail or resale locations and, more specifically, to such an architecture which eliminates the need for installation of highly specialized computer hardware at each participating retail location.

BACKGROUND ART

Generally, submission of loan applications from customers has been historically performed using paper forms which require various personnel to manually input data into a resident computer system at the financial institute for the subsequent review, compilation, evaluation, and approval. Because the processing of these forms is very labor intensive, traditional credit approval processes were highly inefficient and time consuming, particularly since the loan application forms and information contained therein require review for errors, non sequiturs, insufficient and/or incomplete information.

Attempts have been made to improve efficiency and response through on-line type credit authorization systems. Presently, there are two known major automotive credit application services which coordinate loan application information between multiple financial institutes, IBM's AutoLoan Exchange (ALX) and Credit Management Solutions', Inc. (CMSI) Credit Connection. These systems are arranged to allow transmission of credit application information from a dealer location to various financial institutions, as well as transmission of responses from the financial institutions back to the dealer. While these systems have generally improved loan application efficiency and processing time, they also suffer the drawback of requiring installation of unique and specific computer hardware at the dealership location. As a result, these systems are expensive to operate and maintain. In addition, because specially adapted hardware must also be installed at the financial institution end, access via a single information distribution hub is only available to those financial institutions which choose to install the specialized equipment. Thus, a dealer may not be able to improve loan application processing efficiency for financial institutes with whom the dealer chooses to conduct business if the desired institution does not participate in the on-line credit system.

Therefore, a need exists for an improved method and system for processing automotive credit applications which simplify hardware requirements to increase ease of access and use at each participating retail location, while also broadening access to potential financing service providers.

DISCLOSURE OF THE INVENTION

It is therefore an object of the present invention to provide a method and system for processing automotive purchase or lease credit applications which is highly efficient and eliminates any need for specialized hardware at a dealer location by providing two-way communication of loan application information between a dealer and one or more of a plurality of financial institutions using an Internet connection.

In accordance with this and other objects, the present invention provides a credit application system and method which enables an automotive dealer to use a standard Internet browser and personal computer system (PC) located at the retail location to enter credit application data once over an Internet-based connection, and electronically transmit the credit application information to available financing service providers such as banks or service providers like IBM ALX or CMSI Credit Connection. The system and method further provide for return transmission of responses from the service providers, and updating of system databases and retransmission of the responses for display at the dealer location.

To accommodate financial institutions which are unable or choose not to communicate directly with the Internet connection, the system and method of the present invention further provide automatic enabling of facsimile communications with preselected service providers, such as dealer-chosen banks and credit unions. In addition, other information can be automatically collected, processed, and transmitted so as to facilitate the overall automotive credit approval process. Such information can be related to completion of standard department of motor vehicles forms, insurance forms, etc., with two-way communication being provided either directly or through a credit application service provider.

The above object and other objects, features and advantages of the present invention are more readily understood from a review of the attached drawings and the accompanying specification and claims.

BRIEF DESCRIPTION OF THE DRAWINGS

FIG. 1 is a block diagram of an automotive credit/loan application system in accordance with the present invention; and FIG. 2 is a flowchart illustrating processing of an automobile loan/credit application in accordance with the present invention.

BEST MODES FOR CARRYING OUT THE INVENTION

Referring first to FIG. 1, an automotive credit/loan application system 10 includes at least one suitable personal computer (PC) 12 located at a dealership or other retail outlet. While only one terminal is shown, it is to be understood that many different terminals from different dealerships can simultaneously communicate in accordance with the present invention. PC 12 includes any suitable input device 14 such as a keyboard/mouse which permits entry of data into the PC. PC 12 further includes suitable communication hardware such as a modem and software such as a JAVA-enabled Internet browser for communication with other computer equipment over the Internet.

A user/client utilizes PC 12 to connect with a conventional Internet-type Server 16 to gain access to the electronic loan/credit application 18 of the present invention. The electronic loan/credit application 18 is generated in the form of an hyper text mark-up language (HTML) based web page on the Internet by an intermediate system server 20. Intermediate system server 20 includes a computer processing system 21, and a database arrangement 22 for system and transaction record keeping. A user preregisters to receive system authorization via any suitable registration process.

Upon startup, the electronic loan application is arranged to operate as a graphical user interface to assist the user in supplying the necessary information to complete the electronic loan application. For example, image/text screens generated as part of the web page HTML programming include a log-on screen 24 in which a user is prompted to enter user identification (i.d.) and password information. Entry of a valid user i.d./password provides authentication that the user is authorized to use the system. A password screen 26 can be accessed by an authorized user to allow changing of a password.

The electronic loan application form further includes a series of screens for entering loan application data and selecting which finance sources are to receive the application. In a preferred embodiment, the series of screens will typically include image/text screens for setup 28, address 30, employment 32, directs 34, vehicle 36, contract 38, and finance source selection 40.

More specifically, the setup screen 28 includes data entry fields for a user/dealer identification, finance labels, product and class codes authorized under each finance label, lease renewal for leases, dealer contact, and offering type. This screen may also include a data entry field for any co-applicant(s) where necessary.

The address screen 30 includes data entry fields for an applicant's name, date of birth, age, number of dependents, social security number, address, phone number, residence type, length of time at the address, rent/mortgage, and education level.

The employment screen 32 includes data entry fields for current employer, applicant's occupation, phone number, income, and time on the job. This screen may also include a data entry field for other income sources and prior employment history.

The directs screen 34 includes data entry fields for bank and credit references, credit history such as prior repossession or bankruptcy, and alimony or support payments.

The vehicle screen 36 includes data entry fields for information relating to the vehicle to be purchased or leased, such as whether the vehicle is new, used, or a demo, the vehicle identification number (VIN), year, make, model, body style, mileage, wholesale price, and options selected. A data entry field can be provided for similar information regarding any trade-in vehicle.

The contract screen 38 includes data entry fields for information regarding the transaction, such as cash price, amount of down payment, trade allowance, net of amount owed, and term and payment. A field is also provided for input of any comments relating to the transaction.

The finance source selection screen 40 includes data entry fields which allow a user to select or designate which financial institutions or service providers are to receive the electronic loan application. In addition, as described below, if computer processing system 21 detects that a designated service provider or financial institute has not been previously registered or placed within a system database, i.e., not a participating service provider or financial institute, the intermediate system server will automatically enable facsimile transmission of the electronic loan application information to the designated financial institute if the institute has been previously selected by the user.

Other function screens can be included so as to be accessible from any other screen in the electronic loan application form. For example, a file screen 42 can be used to select additional processing functions, such as allowing entry of another loan application, or retrieving credit bureau information about an applicant. A view screen 44 can be included to allow a user to view additional information about a particular loan application. A reports screen 46 can be provided which allows a user to retrieve loan application history. A window screen 48 can be provided to allow switching between multiple loan applications. Finally, a help screen 50 can be included to assist a user in proper input of information, completion or running of the electronic form.

Because of the sensitive and personal nature of the loan application information, all transmitted data from the client is preferably encrypted with private-key encryption using Public Key Cryptography Standards (PKCS). These algorithms use an appropriate level of encryption for all transmitted data and a new public key will be generated for each session.

Information exchanged between the user/client and the intermediate system server will typically pass through a firewall 51. Intermediate system server 20 is arranged in accordance with known programming techniques to place data sent from the client into database 22 for subsequent retransmission and to perform appropriate log reports. The database is updated to reflect any related transaction information sent by a service provider or financial institute as described below.

Intermediate system server 20 operates to coordinate communication between one or more users/clients and a plurality of participating service providers 52, finance sources 54, and other services 56, such as a department of motor vehicles. Communication with services 56 allows the present invention to automatically collect other information related to the vehicle sale/lease transaction, such information related to completion of standard department of motor vehicles forms, insurance forms, etc., with such information being forwarded to the appropriate service provider 56 via the Internet, one of the financial service providers, or other suitable medium. Server 20 reformats or translates data as needed to facilitate communication between the different service providers, such as arranging the data in a format expected by the service provider.

Intermediate system server 20 further includes a facsimile communication device 58. As noted previously, when the server 20 detects the selection of a finance source(s) 60 not stored in database 22, server 20 automatically reformats the loan data from the electronic credit application 18, and transmits the data via facsimile device 56 to the dealer specified financial institution 58.

In addition, intermediate system server 20 is preferably programmed to automatically store information in the event of a system problem. Further, intermediate system server 20 is arranged to maintain respective dealer associated files in database 22 for storing log-on identifications and passwords necessary for communicating with each specific finance source, service provider, etc. Each dealer file can further include predetermined system access rights granted to different employees within a dealership.

Intermediate system server 20 is also programmed to perform routine maintenance procedures such as updating user i.d.s and log-on tables, and archiving and/or purging old records. Communication between the intermediate system server and each service provider and finance source is performed through a suitable fire wall 62 and will use private-key encryption using PKCS for security.

FIG. 2 is a flowchart illustrating the overall process of the present invention. At block 100, a request for an electronic automotive credit/loan application is received from a dealer PC connected to the Internet. The requesting party is then checked at block 102 to determine if they are an authorized user. If not, the request is denied at block 104. If the requesting party is an authorized user, an HTML electronic credit application form is generated at block 106 and transmitted to the requesting user at block 108.

As denoted at block 110, a completed electronic credit application form is received by the intermediate system server 20 and the information therein processed and stored in database 22. At block 112, a determination is made as to whether the finance source or service provider designated in the application form is stored in the system database as a participating service provider. If so, the information is reformatted as needed and transmitted via the Internet to the designated finance source/provider at block 114.

However, if the designated finance source/provider is not in the database, the intermediate system server determines at block 116 whether the designated finance source/provider corresponds to a dealer chosen institution having associated facsimile information stored in a corresponding dealer file in database 22. If facsimile information is not available, the request is denied at block 118. If the facsimile information is available, the application information is then reformatted and facsimile transmitted to the designated finance source/provider at block 120.

As denoted at block 122, a transaction related response is received from the designated finance source/provider. At block 124, the records in database 22 are updated based on the received response. Then, at block 126 the received response is retransmitted for display at the dealer located PC.

It is understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed is:

1. A method for electronic credit/loan application processing for a user at an location having an Internet capable personal computer connected to an Internet server, said method comprising:
    receiving a request via the Internet for an electronic loan/credit application form from the user;
    generating the electronic loan/credit application form as a web page, said electronic form being generated to include an information field in which the user designates a particular financial institute or service provider;
    receiving a completed application form from the user including licensing information associated with a vehicle being purchased or leased;
    determining whether the designated financial institute or service provider is a system participant;
    transmitting information from the completed application form via the Internet to the designated financial institute or service provider if the institute or provider is a system participant, or facsimile transmitting the information from the completed application form to the designated financial institute or service provider if the institute or provider has been preselected by the user;
    automatically transmitting the collected vehicle licensing information to an appropriate licensing agency to facilitate licensing of the vehicle; and
    automatically reformatting the information from the completed application form to be in a format suitable for processing by the designated institute or provider.

2. The method of claim 1 further comprising determining whether the requesting user is authorized to receive the electronic loan/credit application form.

3. The method of claim 1 wherein transmitting via the Internet is performed using encryption.

4. The method of claim 1 further comprising collecting vehicle insurance information as part of the electronic loan/credit application form.

5. A system for electronic credit/loan application processing comprising:
    an Internet capable personal computer at an vehicle retail location; and
    an intermediate system server for communicating over the Internet with the personal computer at the vehicle retail location and a plurality of participating financial institutions or service providers and an appropriate licensing agency, said intermediate system server comprising a computer processing system connected to a database and a facsimile transmission device, said computer processing system arranged to generate an electronic loan/credit application form as a web page in response to a request via the Internet from a user at the vehicle retail location, said electronic form having an information field in which the user designates a particular financial institute or service provider, and an information field in which licensing information associated with a vehicle being purchased or leased is input, wherein said computer processing system is further arranged to determine whether the designated financial institute or service provider is a system participant, and transmit information from a completed application form via the Internet to the designated financial institute or service provider if the institute or provider is a system participant, or alternatively facsimile transmit the information from the completed application form to the designated financial institute or service provider if the institute or provider is not participating but has been preselected by the user, automatically transmit the input vehicle licensing information to an appropriate licensing agency to facilitate licensing of the vehicle, and automatically reformat the information from the completed application form to be in a format suitable for processing by the designated institute or provider.

6. The system of claim 5 wherein said computer processing system accesses the database to verify whether the requesting user is authorized to receive the electronic loan/credit application form.

7. The system of claim of claim 5 wherein said computer processing system further comprises a means for encrypting transmissions over the Internet.

8. The system of claim 5 wherein said generated electronic loan/credit application form comprises a plurality of graphical user interface screens having data fields arranged to receive personal and vehicle transaction related information from the user.

* * * * *